H. H. GROH.
UNION CHECK VALVE.
APPLICATION FILED OCT. 11, 1909.

967,514.

Patented Aug. 16, 1910.

H. H. Groh,
INVENTOR

WITNESSES
Daniel Webster, Jr.
J. O'R. Kelly.

BY

ATTORNEY

UNITED STATES PATENT OFFICE.

HARRY H. GROH, OF MONOCACY, PENNSYLVANIA, ASSIGNOR OF ONE-HALF TO JAMES R. KLINE, OF MONOCACY, PENNSYLVANIA.

UNION CHECK-VALVE.

967,514.　　Specification of Letters Patent.　Patented Aug. 16, 1910.

Application filed October 11, 1909. Serial No. 522,142.

*To all whom it may concern:*

Be it known that I, HARRY H. GROH, citizen of the United States, residing at Monocacy, in the county of Berks and State of Pennsylvania, have invented certain new and useful Improvements in Union Check-Valves, of which the following is a specification.

This invention relates to an improvement in union check valves and the object of my present invention is to produce a union fitting in the form of a check valve, and of such simple construction that its cost will be materially reduced.

A further object in the present instance has been to condense the necessary features of a device of this class in as compact a body as possible and one that can be easily and rapidly disconnected.

The invention is more fully described in the following specification and clearly illustrated in the accompanying drawing, in which:—

Figure 1:
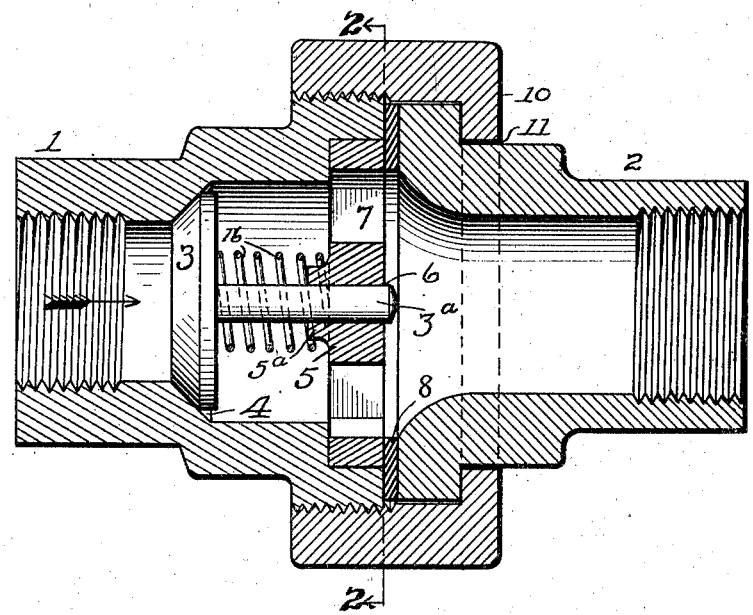
Figure 2:
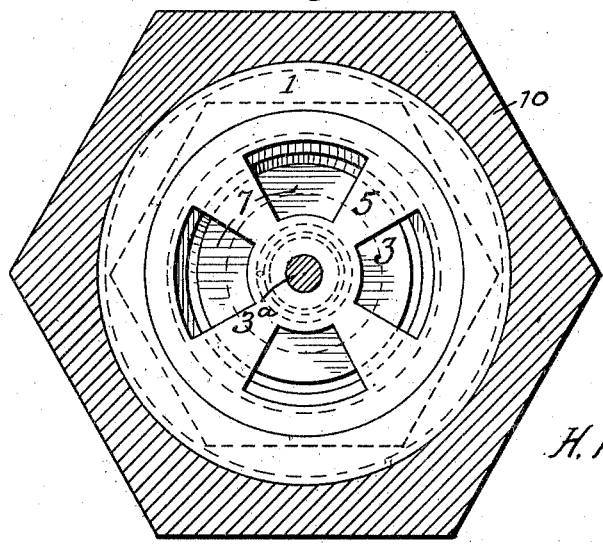

Figure 1 is a central sectional view of my device and Fig. 2 is a sectional view taken through line 2—2 of Fig. 1.

The numerals 1 and 2 designate the two members of the fitting, that is, the members to be joined. The member 1 is provided with a valve 3 which is adapted to close on a valve-seat 4 formed on the inside of the member.

The numeral 5 designates the valve stem guide. This guide is in the form of a disk and is arranged to fit snugly in the inside of the greater diameter of the member 1, and it has a central perforation 6 and a number of openings 7 between this perforation and the outer rim, through which the liquid may pass. This central perforation serves as a guide for the valve stem 3ª, secured to the valve 3, and tends to keep the valve in proper alinement for accurate seating.

The numeral 8 designates a washer, located between the meeting faces of the members 1 and 2 and of sufficient width to hold the disk 5 in place when the parts are drawn together. The members 1 and 2 are each screwed-threaded internally at their contracted ends, that is, at the ends opposite their meeting faces, for the purposes of making the usual connections, and the member 1 is also screw-threaded externally at its enlarged or meeting end.

A clamping sleeve 10 fits loosely over the member 2 and its contracted opening 11 is less in diameter than the greater diameter of the member 2, so that it cannot pass entirely over said member. The sleeve 10 is screw-threaded internally and is adapted to engage the screw threads on the enlarged end of the member 1, whereby the two members may be drawn toward each other, by the turning of the sleeve 10, thus forming a fitting in the form of a union check valve. The guide disk 5 is formed with a lug 5ª on one side and a coiled spring 16 surrounds this lug and also the valve stem, and rests between the valve and the disk in contracted position, thus tending to keep the valve seated at all times.

Having thus fully described my invention, what I claim and desire to secure by Letters Patent is:—

A union check valve, comprising two coupling members, a valve arranged within one of said members, said last mentioned coupling member being provided in one of its ends with a socket, a valve stem guide seated therein, the outer face of the said valve stem guide and corresponding face or edge of the said coupling member being flush, and a packing ring arranged between said coupling members and overlapping said valve stem guide to hold the latter firmly seated in said socket.

In testimony whereof I affix my signature, in presence of two witnesses.

HARRY H. GROH.

Witnesses:
　ED. A. KELLY,
　M. C. KREIDER.